United States Patent [19]

Catron et al.

[11] Patent Number: 5,018,191

[45] Date of Patent: May 21, 1991

[54] SPECIAL SERVICE CALL ROUTING

[75] Inventors: Nancy A. Catron, Long Valley; Richard J. Famulare, Belle Mead; Joseph V. Fodale, Lincroft; Karrie J. Hanson, Westfield; Robert A. Koch, Freehold; Ronald E. Large, Holmdel; Paramdeep S. Sahni, Marlboro; Alan I. Schwartz, Bedminster; Susan M. Zoccolillo, Howell, all of N.J.

[73] Assignee: AT&T Bell Laboratories, Murray Hill, N.J.

[21] Appl. No.: 425,529

[22] Filed: Oct. 23, 1989

[51] Int. Cl.$^5$ ............................................... H04N 1/32
[52] U.S. Cl. ...................................... 379/100; 379/93; 379/94
[58] Field of Search .......................... 379/100, 94, 93; 358/407, 402, 440

[56] References Cited

U.S. PATENT DOCUMENTS

| | | | |
|---|---|---|---|
| 3,728,486 | 4/1973 | Kraus | 379/69 |
| 4,221,933 | 9/1980 | Cornell et al. | 379/84 |
| 4,277,649 | 7/1981 | Sheinbein | 179/18 B |
| 4,491,873 | 1/1985 | Takayama | 379/100 |
| 4,646,160 | 2/1987 | Iizuka et al. | 379/100 |
| 4,870,678 | 9/1989 | Adachi | 379/100 |
| 4,905,273 | 2/1990 | Gordon et al. | 379/100 |
| 4,922,348 | 5/1990 | Gillon et al. | 358/434 |

OTHER PUBLICATIONS

"Telematic Services: Operations and Quality of Service", *CCITT Red Book*, vol. II-Fascicle II.5, Recommendations F.160-F.350, VIIIth Plenary Assembly, Malaga-Torremolinos, Oct. 8-19, 1984.
C. A. Dahlbom et al., "History and Description of a New Signaling System", *The Bell System Technical Journal*, vol. 57, No. 2, Feb. 1978, pp. 225-250.
S. Addicks et al., "Common Channel Signaling: Keystone of the Intelligent Network", *Globecom '86*, Conference Record, vol. 3 of 3, Houston, Tex., Dec. 1-4, 1986, pp. 50.1.1-50.1.6.
M. C. Griffith et al., "800 Service Central Office Implementation", *Globecom '86*, Conference Record, vol. 3 of 3, Houston, Tex., Dec. 1-4, 1986, pp. 50.2.1-50.2.7.
R. A. McGowan, "Common Channel Signaling Gets Services to the Customers", *Globecom '86*, Conference Record vol. 3 of 3, Houston, Tex., Dec. 1-4, 1986, pp. 50.3.1-50.3.3.
R. R. Goldberg, "Generic Requirements for Services in the Common Channel Signaling Network", *Globecom '86*, Conference Record vol. 3 of 3, Houston, Tex., Dec. 1-4, 1986, pp. 50.4.1-50.4.3.
D. J. Marutiak, "AT&T Common Channel Signaling Services and Products", *Globecom '86*, Conference Record, vol. 3 of 3, Houston, Tex., Dec. 1-4, 1986, pp. 50.5.1-50.5.6.
L. Y. Ong, "Protocol Interworking for ISDN Services", *Globecom '86*, Conference Record vol. 3 of 3, Houston, Texas, Dec. 1-4, 1986, pp. 50.6.1-50.6.5.

Primary Examiner—Jin F. Ng
Assistant Examiner—Stella Woo
Attorney, Agent, or Firm—Werner Ulrich

[57] ABSTRACT

This invention relates to methods of establishing facsimile (fax) connections. When it is determined that a call is a fax call, a fax indicator is sent with Common Channel Signaling (CCS) messages for that call. If a call with a fax indicator is received in a destination switching office, then the destination office checks to see if the called number is a fax number; if not, translation is made to find the number of a fax station for serving fax calls to the called number, and the call is completed to that fax station. Fax calls may be recognized by a fax class mark in an originating message from an Integrated Services Digital Network (ISDN) line or a dialed prefix such as #, #3, or an alternative common carrier code (10XXX) from an ordinary line. Calls may be automatically redirected to a store and forward system on busy or no answer, routed to one of a plurality of alternative destinations based on the day and time, junk fax calls may be screened, and a fax message waiting lamp on the called (voice) destination may be operated. For international calls, a translation from voice to fax may be made at an egress gateway switch; the fax calls may also be automatically routed over low distortion international transmission facilities.

23 Claims, 4 Drawing Sheets

SPECIAL SERVICE CALL ROUTING

CROSS REFERENCE TO RELATED APPLICATIONS

This application is related to the application of Alexander C. Gillon, Adam V. Reed, and John M. Scanlon entitled "Improved Facsimile Service", Ser. No. 309,586 filed Feb. 10, 1989. This application is also related to the application of Nancy A. Catron, Joseph V. Fodale, Karrie J. Hanson, Robert A. Koch, Ronald E. Large, and Susan M. Zoccolillo entitled "Improved Facsimile Service", Ser. No. 399,384 filed Aug. 24, 1989.

This application is related to the application of Nancy A. Catron, Joseph V. Fodale, Karrie J. Hanson, Robert A. Koch, Ronald E. Large, and Susan M. Zoccolillo, Ser. No. 399,384, entitled "Improved Facsimile Service", a continuation-in-part filed Aug. 24, 1989, of an application Ser. No. 358,743 filed May 30, 1989, now abandoned.

TECHNICAL FIELD

This invention relates to facsimile service and other specialized types of telecommunications calls.

PROBLEM

Facsimile service is becoming increasingly popular because of the wide availability of relatively inexpensive facsimile machines. Facsimile (fax) service however still presents some problems. One common problem is attempting to send a facsimile message to a customer whose telephone number is known but whose facsimile number is not known. Under these circumstances, a separate call is typically required to identify the customer's facsimile number. This is wasteful of the calling and called customer time and is also expensive since an extra call is required.

International facsimile calls ideally should be transmitted over selected circuits with low distortion since conventional facsimile signals may be excessively distorted over many other international voice transmission facilities. Getting access to such selected circuits presents a problem.

Advances in fax service now enable a customer encountering a busy or ring-no-answer condition on a fax call to send a facsimile message to a store and forward facility for subsequent transmission to the destination facsimile machine when that facsimile machine is available. However, such service reorigination involves a time consuming process in order to call a store and forward facility and to redial the called number into that facility for subsequent fax delivery. In view of the foregoing, needs exist in the art to process fax calls to a fax machine without the caller dialing the fax number, to process international fax calls over special low distortion circuits, and to simplify the process of sending calls to a store and forward facility. Similar needs are encountered in other types of specialized telecommunication calls such as calls to a recipient voice messaging system and electronic mail system.

SOLUTION

The foregoing needs are met and an advance is made over the prior art in accordance with the principles of this invention wherein in an illustrative embodiment, facsimile calls are processed to a fax destination by class of service marks, illustratively, a flag in a call set-up common channel signaling (CCS) message, for special treatment in their processing through a common carrier network. The calls are illustratively recognized as being fax calls by a prefix comprising a special alternative common carrier code such as 10XXX or a non-numeric indicator such as the # sign or a # sign plus one or more digits keyed on a dual tone multi-frequency (DTMF) customer station dialed by the customer and recognized in the network as designating a fax call, or by a fax mark, data sent along with a message to set up a connection, from an integrated services digital network (ISDN) line. Advantageously, such a class mark permits a number of special fax features to be implemented, including automatic transfer of fax calls from the number of a called voice station to an associated fax number, automatic routing of international fax calls over selected facilities, and automatic conversion of a conventional fax call to a store and forward call on busy or on ring-no-answer condition.

If a call is recognized as being a fax call, the fax caller may dial a conventional (voice) telephone station line and have that call connected automatically to a fax machine serving that station line instead of its telephone. That action is achieved by recognizing a fax traveling class mark at a destination switching office controller or processor or network control point processor, having that processor consult a memory to derive a fax destination number serving the called party, and then controlling the routing of the fax call to that fax destination instead of the telephone identified by the dialed number. When this happens, a fax message waiting indication may be activated on the called voice phone.

Another feature of the invention is that when a facsimile call is recognized, a receiver is attached to the call to detect if the calling customer dials additional digits for requesting a store and forward connection. The customer may dial such additional digits in response to hearing that the called facsimile number is busy or detecting that the called facsimile number does not answer. When the additional digits are detected, the call is routed to a store and forward facsimile facility and the previously dialed called number and the originating customer's number are automatically forwarded to that store and forward facility for delivery of the call, delivery of a confirmation, and for billing. Alternatively, the network can automatically forward calls from that calling customer to a store and forward facility on busy or ring-no-answer condition.

Another feature of this invention is that the called customer may specify that fax calls to busy or ring-no-answer condition be automatically rerouted to a fax store and forward facility. On international fax calls, the invention provides facilities in an international gateway switch to ascertain that the call is a facsimile call and automatically to route the call over selected low distortion transmission facilities for quality communication. Further, a translation from the voice number to an associated fax number is made at the gateway switch, either directly or by accessing a shared database, to provide automatic routing to an associated fax machine for countries which have not implemented automatic rerouting of calls from voice to fax machines. For Direct Services Dialing Capability (DSDC) calls, such as "800" or "Freephone" calls, a DSD Network Control Point, a database shared by a plurality of Interexchange Carrier (IXC) switches, provides the necessary data for processing calls in accordance with the principles of this invention.

More generally, a large number of calls, consisting of several broad classes of specialized calls, can be handled advantageously by permitting a routing to a destination other than the nominal destination based upon the type of the call. Examples of types of calls are facsimile calls, calls directly to the voice messaging system serving the intended recipient, and calls to the electronic mail system serving the intended recipient. The type of the call can be established automatically, illustratively, in the local switch from either the line equipment appearance number of the calling line or the directory number of the calling customer (and communicated from a local switch to an IXC switch via information digits), and in an IXC switch on the basis of the calling customer directory number as forwarded through automatic number identification facilities or through additional digits collected from the originator of a call in response to a network provided prompt.

Accordingly, this invention is an arrangement for recognizing fax calls by a special prefix or an indicator in a data message from customer equipment, and responsive to such recognition, to automatically transfer a fax call to a voice destination to the fax machine associated with that voice destination. A fax call indicator, such as a traveling class of service mark in CCS messages for the call, is used to communicate that the call is a fax call to switching offices and NCPs for that call.

DETAILED DESCRIPTION

Figure 1:
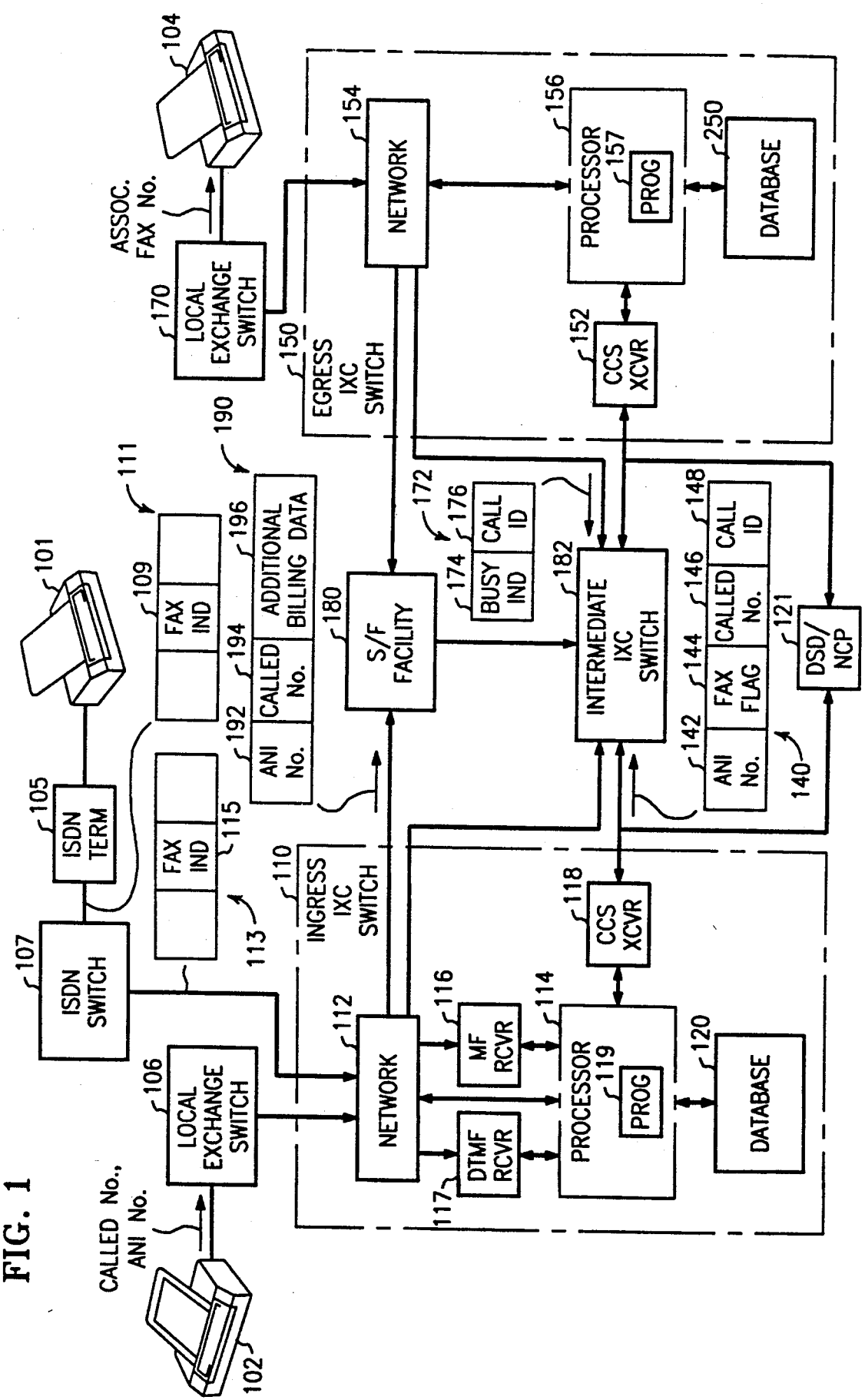
FIG. 1 is an overall block diagram of an interexchange carrier system for implementing applicants' invention.

FIG. 1 is a block diagram showing major elements required to implement applicants' invention. Three facsimile machines are shown, originating facsimile machine 102, originating facsimile machine 101, connected to an ISDN termination 105, and terminating facsimile (fax) machine 104. In accordance with one specific embodiment, each such machine is "registered" with the carriers serving the customer, and, as indicated below, data is recorded in the appropriate switches that the customer's line is, in fact, connected to a fax machine. Each of these machines has an associated telephone number. Originating facsimile machine 102 is connected to serving local exchange switch 106, and originating fax machine 101 is connected to local exchange switch 107 equipped to support ISDN. The number of the originating facsimile machine 102 is referred to hereinafter as the calling number and is the number identified by Automatic Number Identification (ANI) at the connected local exchange carrier (LEC) switch 106. ANI is also provided for fax machine 101 in order to verify that the associated customer has subscribed to the service.

The terminating facsimile telephone number will be referred to hereinafter as the associated facsimile number; in this example, the caller at facsimile machine 102 or 101 does not know the telephone number of facsimile machine 104 but instead knows only the voice telephone number of a customer who is served by facsimile machine 104. However, as discussed infra, the interexchange carrier network has information stored in a table to translate from that voice telephone number to the number of fax machine 104.

Figure 2:
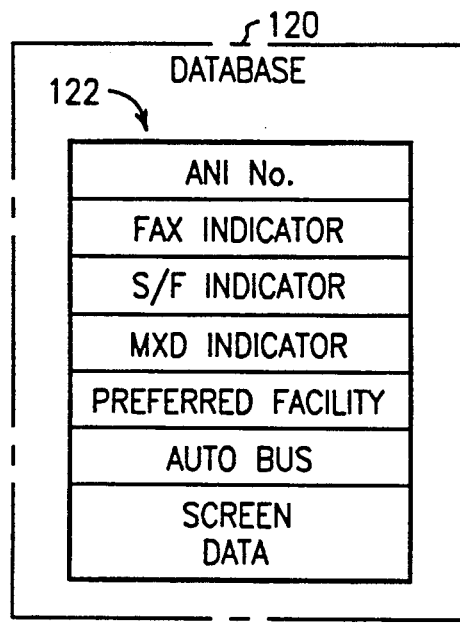
FIGS. 2 and 3 are memory layouts of databases of interexchange carrier switches used for processing calls.

When originating facsimile machine 102 places a call to a called number (the number of the voice telephone of the customer to whom a facsimile message is to be sent), the called number and the number of facsimile machine 102, identified by ANI facilities in local exchange carrier switch 106 and hereinafter referred to simply as the ANI number, are sent to ingress interexchange carrier (IXC) switch 110. In this specific embodiment, the IXC switches are 4 ESS TM switches, described in *The Bell System Technical Journal*, Vol. 56, No. 7, September 1977, pages 1015-1320. Signaling between LEC switch 106 and IXC switch 110 is carried out using Feature Group D signaling which permits the signaling of ANI data. Feature Group D signaling is specified in Bellcore document: *Notes on the BOC Intra-LATA Networks*-1986, Technical Reference TR-NPL-00275, Issue 1, April 1986, Section 6. The IXC switch 110 comprises a switching network 112 for interconnecting communications ports, a processor 114 for controlling the operations of the switch, dual tone multifrequency (DTMF) receivers 117 for receiving DTMF signals from fax machine 102, MF receivers 116 for receiving signals from local exchange carrier switch 106, a common channel signaling (CCS) transceiver 118 for transmitting messages to other IXC switches, and a database 120, shown in FIG. 2, for storing, among other items, a table 122. The table 122 stores ANI numbers associated with facsimile machines served by switch 110 and, for each such facsimile machine, an indicator of whether store and forward service is offered to that machine, an indicator of mixed use service, and an indicator of automatic connection to store and forward on busy or on ring-no-answer condition.

More generally, a number of methods can be used for identifying that a call is a fax call. The customer at machine 102 may also signal a fax call by dialing a special prefix, illustratively a special common carrier identification prefix, which is recognized at local exchange 106 or ingress switch 110 as designating a fax call. The ingress switch responds to this prefix, either received from the customer via local exchange switch 106, or transmitted in the form of a special signal from switch 106, by treating the call as a fax call as described hereinafter. The customer at fax machine 101, connected to local exchange switch 107 by an integrated services digital network (ISDN) connection, automatically signals a fax call via a fax indicator 109 in a call setup message 111 to switch 107. Switch 107 passes on a fax indicator 115 in a signaling message 113 to ingress switch 110. The presence of fax indicator 115 is a signal to switch 110 that the associated call is a fax call.

Other methods of recognizing a fax call include a class of service translation performed at an originating office to recognize that the call is from a fax machine. This class of service is then transmitted to an ingress switch by information digits as described hereinafter; alternatively, the information can be transmitted in a CCS message.

Another method of recognizing a fax call is by a prefix such as #, # plus one or more digits (for example, #3=#F), or an alternative common carrier code such as 10XXX. The local office recognizes this prefix and signals the prefix to a toll carrier in one of the ways described above, or simply passes the prefix as well as the rest of the digits to the ingress switch.

When an incoming call from LEC switch 106 is detected in switch 110, the call is connected through network 112 to an MF receiver 116 to receive the called number and the ANI number transmitted from switch 106. Processor 114, operative under the control of program 119, records these digits as they are received and checks in database 120 to see if the ANI number corresponds to a facsimile machine, or whether the ANI number corresponds to a mixed use line. The treatment of mixed use lines is discussed hereinafter with reference to FIG. 4, blocks 230 and 232. In this case, the ANI number corresponds to facsimile machine 102 which, it is assumed for the purposes of this description, also has a store and forward indicator indicating that this machine has subscribed for store and forward service. The database 120 also includes screening data to prevent a particular ANI from making toll calls outside a particular range, or from making international calls. If the call is destined for a Direct Service Dialing Capability (DSDC) subscriber service such as "800" or Freephone service, then processor 114 queries the appropriate DSD Network Control Point (DSD/NCP) 121 as in the prior art to obtain the correct processing information and in addition will also do the additional processing and information retrieval for called party initiated features, such as voice to fax translation and redirect to store and forward for example. This information must be passed to the egress IXC via fields in message 140. Calls that are screened are simply not accepted and the caller receives a disconnect.

After the call has been received in switch 110, the call is routed toward an egress IXC switch 150 which can access the LEC switch 170 which serves the called number. It is assumed in this case that the connection must go through an intermediate IXC switch 182 in order to reach egress IXC switch 150. A CCS message 140 is sent to intermediate IXC switch 182 using CCS transceiver 118 and controlled by processor 114. The message 140 comprises segment 142, containing the ANI number, segment 144 containing a fax flag indicating that this is a call originated from a fax machine, segment 146 comprises the called number, and segment 148 comprising an identifier for identifying the call. Such a message is sent for any call recognized as being a fax call, regardless of whether the originating customer has subscribed to a fax specific feature. Alternatively, two or more flags may be used, a fax flag indicating that this is a fax call, and one or more additional flags specifying calling customer fax features, such as routing over preferred facilities or automatic rerouting. The preferred facilities flag can be set in response to a class of service indicator, specifying that the caller is willing to pay a premium to have fax calls routed over preferred international facilities.

Figure 3:
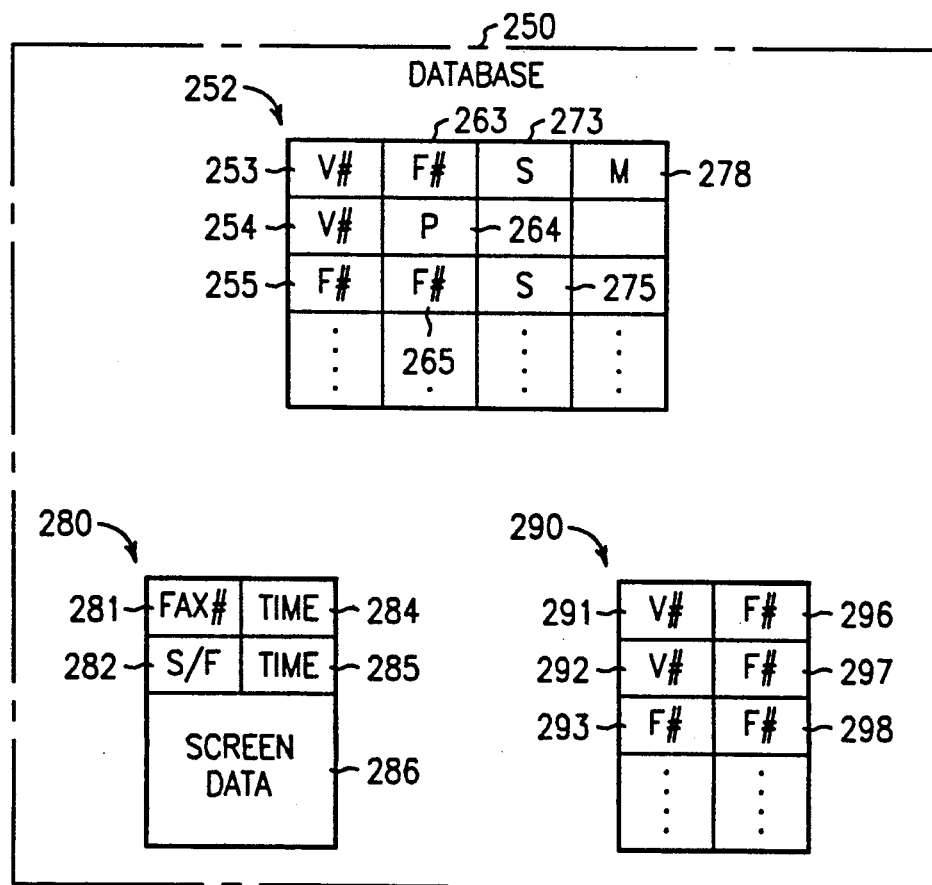

Intermediate IXC switch 182 receives the message over CCS facility and the associated call over a transmission facility, and sets up an additional connection to egress IXC switch 150 and transmits the message 140 to that switch. Intermediate IXC switch 182 and egress IXC switch 150 are similar to ingress IXC switch 110. The call is connected to network 154 of egress IXC switch 150. The message 140 is received in CCS transceiver 152 of switch 150. Processor 156 of switch 150, operative under the control of program 157, examines message 140 and recognizes fax flag 144. Processor 156 then queries database 250, shown in detail in FIG. 3, of switch 150 to access voice to fax (V-T-FAX) translation table 252. This table translates from the called number such as 253 to the associated fax number such as 263 for LEC switches served by the egress IXC switch. The entries 253, 254, 255 may be either voice or fax numbers. Fax numbers are recognized because the corresponding fax entry, 263, 264, 265 matches the voice or fax number. In the example, a match is found between entries 255 and 265, indicating that the directory number 255 is a number of a fax machine. Customers with fax machines who do not need translation from a voice to a fax number need not have an entry in table 252 since the call can be completed normally whether or not a fax flag is present. If these customers require special fax features, an entry such as 255 is used. For voice numbers, a message waiting lamp indicator, such as 278, associated with voice number 253, is available which, if set, causes a fax message waiting lamp on the voice station to be lit when a fax call is received. The message waiting lamp is lit via a data message sent from the egress switch to a local switch connected to the voice line; this is particularly straightforward if the voice line is an ISDN line.

The translation table also has an indicator 273 to specify whether the call should be automatically routed to a store and forward facility such as 180, so that all overflow fax traffic can be recorded for subsequent transmission to the desired fax terminal. In the case of a call whose dialed number is a voice number, such as 253, egress IXC switch 150 then forwards the associated fax number, not the called number, to store and forward (S/F) facility 180. The call is then subsequently completed from S/F facility 180 via IXC switch 150 to LEC switch 170 which serves terminating fax machine 104. If fax machine 104 is available, the call is set up. If the call is to a fax number such as 255, and the fax number is busy, if the store and forward indicator 275 is set, the call is forwarded. In an international gateway switching system, the V-T-FAX translation is made for countries which have not implemented the features of this invention. The translation may be stored either in the switching system or in a remote database (not shown).

Database 250 can make a number of other translations besides voice to fax. If completion to one of several fax numbers according to the time of day or day of week is desired, or other more complex routing is desired, a translation is made from a called number such as 254 to a pointer such as 264 which points to a block of memory 280. This block includes a number of alternative destinations 281, 282, according to the time and/or day of week 284, 285. In this case, one of the destinations, destination 282, is a store and forward facility 180 for automatically storing the facsimile message for subsequent delivery. The block also contains screening data 286 to block calls from certain numbers or to only permit calls from certain numbers to be completed; this is useful, for example, for shielding fax machines from receiving excessive "junk fax" messages.

Database 250 also comprises a block 290 for translations for international calls to countries that have not implemented the voice to fax translation. Entries 291, 292, 293 have corresponding translation results 296, 297, 298. Entries 291 and 292 represent voice numbers whose corresponding fax numbers are 296 and 297. Entry 293 is a fax number as indicated because corresponding entry 298 is the same. If the called number is not found in block 290, it is assumed that the called number is a fax number and that the call can be completed normally.

There exists a requirement that enhanced services (which includes store and forward fax) must be capable of being provided by anyone. If fax machine 104 is either busy as indicated to the caller via busy message 172 sent from egress IXC 150, or if fax machine 104 does not answer, then the customer at fax machine 102 may key a group of DTMF signals for requesting a store and forward connection. Because of the requirement, it is necessary for the customer to key information for specifying a desired store and forward carrier. For greater clarity, it is assumed in this case that the store and forward carrier is one associated with the interexchange carrier and therefore connected using switches of that interexchange carrier. For further simplicity, it is assumed that the store and forward facility 180 accessible from ingress IXC switch 110 is also connected via intermediate IXC switch 182 and egress IXC switch 150 to facsimile machine 104. If the customer hears a busy tone or recognizes that facsimile machine 104 is not answering, then the customer at facsimile machine 102 keys data for specifying use of store and forward facility 180 on this call. The connection from IXC switch 110 to fax machine 104 is removed and instead facsimile machine 102 is connected via IXC switch 110 to store and forward facility 180. Common channel signaling message 190 is sent to store and forward facility 180. This message 190 includes segments 192 comprising the ANI number, 194 comprising the called number, and optionally segment 196 for additional billing data such as a subaccount billing number. Both the ANI number and the called number have been retained in the memory of processor 114 and do not need to be redialed or retransmitted to IXC carrier switch 110. The store and forward facility 180 sends a fax flag along with fax call set-up messages. For customers who prefer an automatic connection to a store and forward facility on busy, the busy indicator 174 on CCS message 172 is used to set up the connection to the store and forward facility automatically.

In case the recognized fax call is further recognized in ingress IXC switch 110 as being a Direct Services Dialing Capability (DSDC) call, a request message similar to message 140 is sent to Direct Services Dialing/Network Control Point (DSD/NCP) 121 with a fax flag 144 marked. The DSD/NCP 121 translates this request message using a database, comprising data similar to that in database 250 for translating voice to fax numbers, and returns a translated-to-fax number in a response message to switch 110. Thereafter, the call is processed as if the translated-to-fax number had been called by the calling station. If the called customer has any terminating features such as redirect to another station or to store and forward, the data describing these features is supplied in the response message from the DSD/NCP 121 and is forwarded to egress IXC switch 150 in message 140. In the case of screening, if the call is screened so that completion is denied, the call need not be forwarded from the ingress IXC 140 to the egress IXC 150, but can be blocked in IXC 140 on the basis of data returned in the response message.

Figure 4:
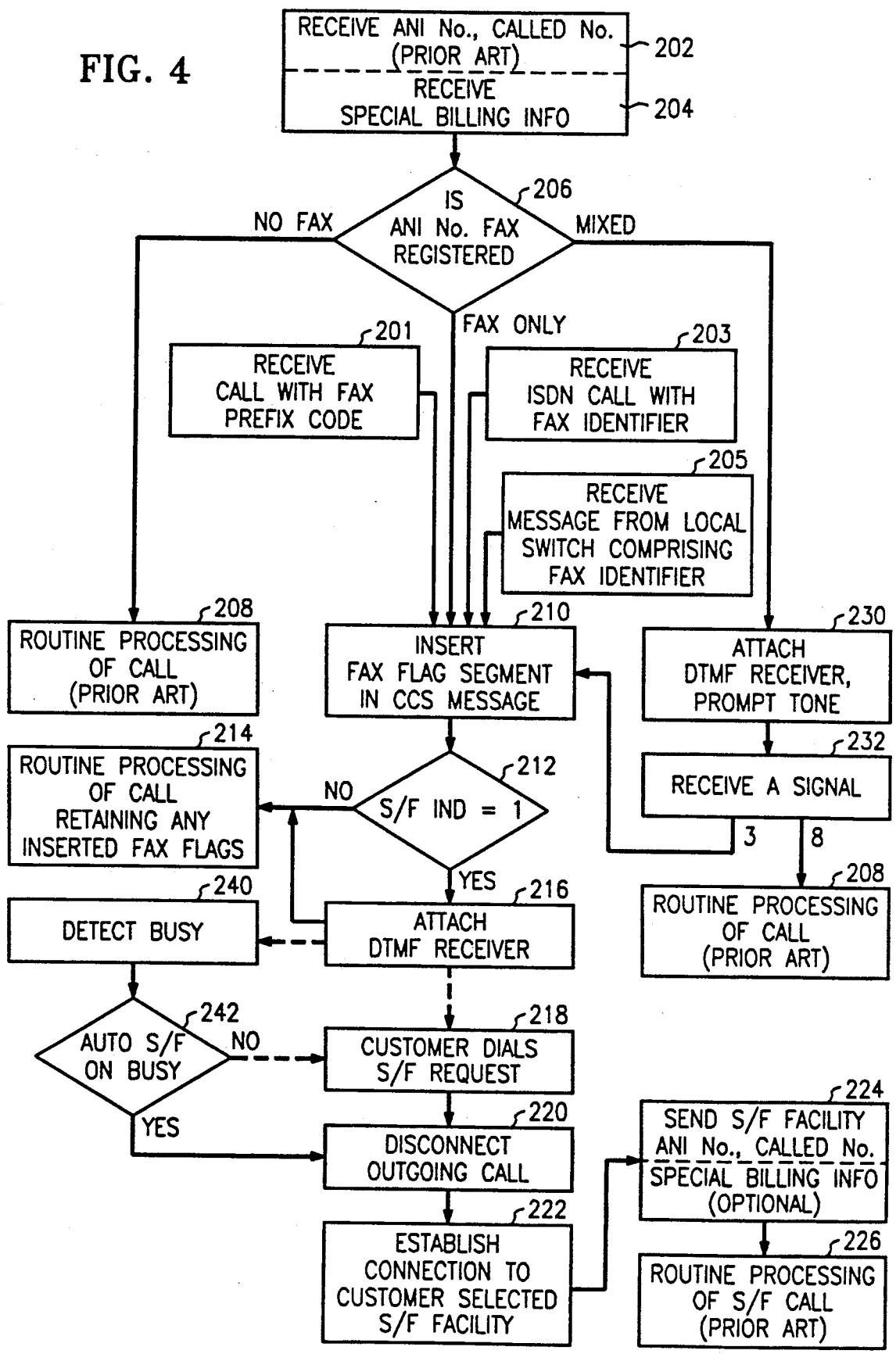
FIGS. 4 and 5 are flow charts of programs for controlling actions required to implement applicants' invention in an interexchange carrier ingress and egress switch, respectively.

FIG. 4 is a flow chart of actions performed in the ingress switch under the control of program 119. The ANI number and the called number for a call are received in the ingress switch (action block 202). This block is performed as in the prior art. In addition, special billing information such as a subaccount billing number may also be received along with the call (action block 204). Subaccount billing procedures are described in Bauer et al.: U.S. Pat. No. 4,776,004. Next, the ANI number is checked to see whether it is associated with a fax machine (test 206), or a mixed use line. If not, then routine call processing in accordance with the principles of the prior art is performed for that call (action block 208). If the ANI number is associated with a fax machine, then a fax flag, and, alternatively, a preferred facilities routing flag, is inserted in the CCS message to be sent to the next switch to which this call is to be routed. Next, test 212 checks whether the store and forward indicator for that ANI number is 1. If not, then the call is processed routinely from that point with the exception of the retention of the fax flag in the CCS message being generated (action block 214). If the store and forward indicator is 1, then a dual tone multifrequency (DTMF) receiver is attached to the call (action block 216) and thereafter the call is processed routinely as previously described with respect to action block 214. If subsequently dialed DTMF digits are detected, representing a store and forward request (action block 218), then the outgoing call from the ingress IXC switch is disconnected (action block 220) and a connection to the customer selected store and forward facility identified by the store and forward request dialed by the customer is established (action block 222). The ingress IXC switch then sends to the store and forward facility the ANI number, the called number, and any special billing information generated in action block 204 (action block 224). Thereafter, the call is processed as a routine facsimile store and forward call wherein the CCS call set up message includes a fax flag. It is, of course, necessary to make sure that a S/F call is not terminated to another S/F system, since such a case could lead to a large number of S/F message deliveries for one call (action block 226). If the called terminal is busy, and message 172 including busy indicator 174 is detected (action block 240), then if the calling fax number has automatic store and forward on busy (positive result of test 242), the actions starting with action block 220 are performed; if the result of test 242 is negative, the system continues to wait for a customer dialed store and forward request.

If the ANI number is associated with a mixed use line, a DTMF receiver is attached and the caller is prompted to key a 3 (for "F") for fax use or 8 (for "V" representing voice) for non-fax use (action block 230). If a 3 is detected, indicating a fax call, then the actions previously described starting with action block 210 are performed. If an 8 is detected, indicating a non-fax call, then routine call processing as indicated in action block 208 is performed. Any pair of different keys may be used to indicate fax or non-fax.

There are a number of other methods for recognizing a fax call. A fax call from an ISDN line can be recognized by the fax identifier in a signaling message received at the ingress switch (action block 203). In response to reception of a call with this identifier, the actions previously described, starting at action block 210, are executed.

A call from a station 102 can also be recognized at the ingress switch as being a fax call by a prefix such as a special alternative common carrier code taken from those numbers of the series 10XXX which have not been used to identify a common carrier and which have not otherwise been assigned or a prefix code whose initial character is non-numeric such as # or #9 (action block 201). The special alternative common carrier code should probably also specify a common carrier, since otherwise customers could not specify an alternative common carrier on a fax message sent in accordance with the principles of this invention. In response to reception of a call with this special code, the actions previously described, starting at action block 210, are performed.

Another alternative method of recognizing that a call is a fax call is the following: Feature Group B and Feature Group D of Equal Access Signaling, as described in the Bellcore document *Notes on the BOC Intra-LATA Networks-* 1986, Technical Reference TR-NPL-000275, Issue 1, April 1986, Section 6, provides for the transmission of two digits, called Information Digits ("II" digits), between network switches to classify a call. II digits have traditionally been used to identify coin phones, hotels, etc. and have been more recently used to identify services such as virtual private networks and wide-area telephone services. An II digit pair, can be used to identify a fax call. These II digits can be transmitted by a local exchange 106 and received in an IXC switch 110 as a method of identifying the call as a fax call (action block 205). Once the call classification is communicated to the IXC network, the classification can be communicated to other switches in the IXC network via an indicator 144 in a CCS message 140. Alternatively, the II digits can be transmitted in an additional segment as part of the CCS message 140 and can be interpreted in IXC switch 150 to recognize a fax call or to recognize the indication of another special service type of call.

Figure 5:
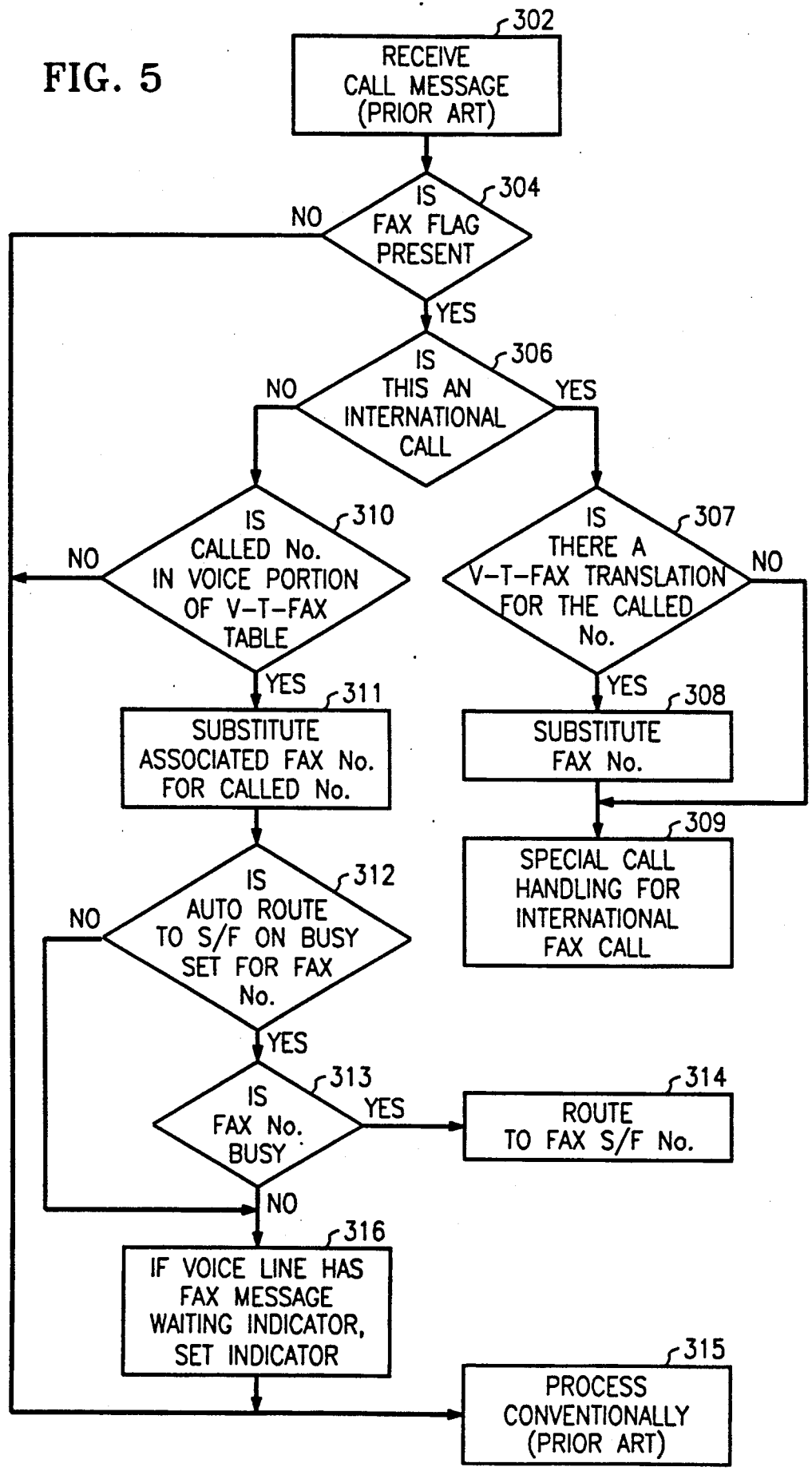

FIG. 5 is a flow chart of actions performed in the egress IXC switch. The CCS message for an incoming call is received in action block 302 in accordance with the prior art. This message is checked to see if the facsimile flag is present (test 304). If not, then the call is processed conventionally as in the prior art (action block 314). If the facsimile flag is present in the CCS call message, test 306 is used to determine whether this is an international call. If so, then the special handling for international calls is performed. First, a check is made to see if there is a V-T-FAX translation for the international called number (test 307). If so, the translated number is substituted for the called number (action block 308). The call is then routed over low distortion facilities satisfactory for transmitting facsimile signals (action block 309). If this is not an international call, then the voice-to-fax translation table is checked to see if the called number is in the "voice" portion of that table (test 310). If so, then the associated fax number is substituted for the called number (action block 311). The fax number, either as directly received, or as translated, is then further translated to find whether an automatic route to store and forward on busy or no answer within a predetermined time indicator is set (test 312). If the fax number is busy or does not answer within a predetermined time and that indicator is set (test 313), the call is routed to a store and forward facility (action block 314). If the call is not forwarded to a store and forward facility, then if the voice number has an associated indicator such as 278 marked, then the fax message waiting indicator for that voice number is set (action block 316). Thereafter, the call is processed conventionally (action block 315). The translation, as discussed earlier with respect to database 160, is flexible and can be different for different times of the day and/or days of the week, can include automatic redirection of calls for one fax number to another, and can include automatic routing to a store and forward facility 180, either on busy, or at the appropriate times of the day/days of the week. If calls are forwarded from the egress switch to an alternate destination, the terminating party may have to be separately billed for a portion of the call. If a combined voice/fax instrument is associated with the called number, then the presence of the fax flag permits the egress IXC switch to recognize that this is a fax call and to initiate any terminating action necessary to assure that the call is treated as a fax call.

While this description has been in terms of facsimile calls and identification of the call via ANI, arrangements can be used for other classes of specialized calls and for the identification of those classes of calls by other means. All that is needed is a means to identify the class of the call, a means of transmitting the class of the call to an egress or local destination switching office controller or processor, and a means of translating the dialed number into the appropriate number associated with the dialed number based on the class of the call.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method of setting up a facsimile call comprising the steps of:
   recognizing a special dialed prefix of the call indicating that the call is from a facsimile station;
   responsive to said step of recognizing, setting a facsimile indicator in data of a common channel signaling (CCS) message being sent to a switching system for further routing said call; and
   processing the call as a facsimile call in the switching system.

2. The method of claim 1 wherein said special dialed prefix comprises a special common carrier code.

3. The method of claim 1 wherein said special dialed prefix comprises a non-numeric dialed indicator.

4. A method of setting up a facsimile call comprising the steps of:
   in a first switching system, recognizing a facsimile call identifier in a signaling message from customer equipment;
   responsive to said step of recognizing, setting a facsimile indicator in data of a common channel signaling (CCS) message being sent to a second switching system for further routing said call; and
   processing the call as a facsimile call in the second switching system.

5. The method of claim 4 further comprising:
   sending said signaling message over an integrated signaling line.

6. The method of claim 5 wherein said sending comprises:
   sending said message over an integrated services digital network (ISDN) line.

7. The method of claims 1 or 4 wherein said processing step comprises the steps of:
   determining that the call destination is other than a facsimile station;
   responsive to said step of determining, translating the identity of the call destination to the identity of an associated facsimile station; and responsive to said step of translating, completing the call to the associated facsimile station.

8. The method of claim 7 further comprising:
responsive to said step of translating, sending an indication of a received facsimile message to said call destination.

9. The method of claim 7 wherein said step of translating comprises:
translating the identity of the call destination to the identity of a plurality of associated facsimile stations; and
selecting one of said plurality according to time of day or day of week.

10. The method of claim 7 wherein said step of translating comprises:
translating the identity of the call destination to the identity of a plurality of associated facsimile stations; and
selecting one of said plurality that is available.

11. The method of claims 1 or 4 further comprising the steps of:
detecting that a destination of said call is busy;
automatically connecting said call to a store and forward facility for subsequent delivery.

12. The method of claims 1 or 4 further comprising the step of:
following said processing step, responsive to reception of dialed information from a caller of said call, automatically connecting said call to a store and forward facility for storing a facsimile meassage for subsequent delivery without requiring said caller to reoriginate.

13. The method of claims 1 or 4 wherein said processing step comprises the steps of:
detecting that said call is an international call; and
responsive to said step of detecting, routing said call over special transmission facilities for transmitting facsimile calls.

14. The method of claims 1 or 4 further comprising the step of:
responsive to said step of recognizing, setting a preferred facilities indicator in data of said common channel signaling message; and
wherein said processing step comprises the steps of:
detecting that said call is an international call; and
responsive to said detecting, if said preferred facilities indicator is set, routing said call over selected special transmission facilities.

15. The method of claim 14 wherein said step of setting a preferred facilities indicator comprises:
testing whether said facsimile station has a class of service for requesting use of preferred facilities on international calls.

16. A method of setting up a facsimile call comprising the steps of:
in a first switching system, recognizing that the call is from a facsimile station;
responsive to said step of recognizing, setting a facsimile indicator in a common channel signaling (CCS) message being sent to a second switching system for further routing said call; and
responsive to receiving said message in said second switching system, checking whether the call is to be forwarded to a store and forward system; and
responsive to the check, forwarding the call from said second switching system to a store and forward system.

17. The method of claim 16 wherein said checking comprises:
checking a status of a destination of said call to determine whether the call is to a busy destination.

18. The method of claim 16 wherein said checking comprises:
checking data for a destination of said call to determine whether the call is to be forwarded for the time of day and day of week.

19. A method of setting up a facsimile call comprising the steps of:
in a first switching system, recognizing that the call is from a facsimile station;
responsive to said step of recognizing, setting a facsimile indicator in data of a common channel signaling (CCS) message being sent to a second switching system; and
processing the call as a facsimile call in the second switching system;
wherein said step of processing comprises:
responsive to receiving said message, checking whether the call is to be forwarded to another facsimile line; and
responsive to the check, forwarding the call to said another facsimile line.

20. A method of sending a facsimile message from a first facsimile station to a second facsimile station comprising:
connecting said first facsimile station to a first switching system;
recognizing in said first switching system that said first station is a facsimile station;
extending the connection from the switching system to an egress switch of a telecommunications network and notifying said egress switch that said connection is for transmitting facsimile signals;
in said egress switch, checking a store and forward indicator in data of the second facsimile station;
if the second facsimile station is busy and the indicator is set, extending the connection from said egress switch to a facsimile store and forward facility; and
subsequently, delivering the message from the store and forward facility to the second facsimile station.

21. The method of claim 20 wherein the second facsimile station is a group of stations, and wherein the connection is extended to the store and forward facility if all the members of the group are busy.

22. A method of setting up a facsimile call comprising the steps of:
recognizing that the call is from a facsimile station;
responsive to said step of recognizing, setting a facsimile indicator in a common channel signaling (CCS) message being sent to a switching system for further routing said call, said message comprising a first number identifying said facsimile station and a second number identifying a destination;
responsive to receiving said message in said switching system, translating from said second number to derive screening data; and
responsive to said step of translating, comparing that said screening data with said first number to determine whether the call should be extended from said switching system toward another switching system for completing said call.

23. A method of setting up a facsimile call comprising the steps of:
recognizing that the call is from a facsimile station;

responsive to said step of recognizing, setting a facsimile indicator in data of a common channel signaling (CCS) message being sent to a switching system for further routing said call;
responsive to receipt of said CCS message, detecting that said call is an international call; and
translating from a destination number received in said CCS message to an associated facsimile destination number for extending said call from said switching system toward a facsimile station associated with said destination number.

* * * * *